May 11, 1937.                H. W. MILLMINE                2,079,998
                                PUMP PISTON
                            Filed Jan. 12, 1934
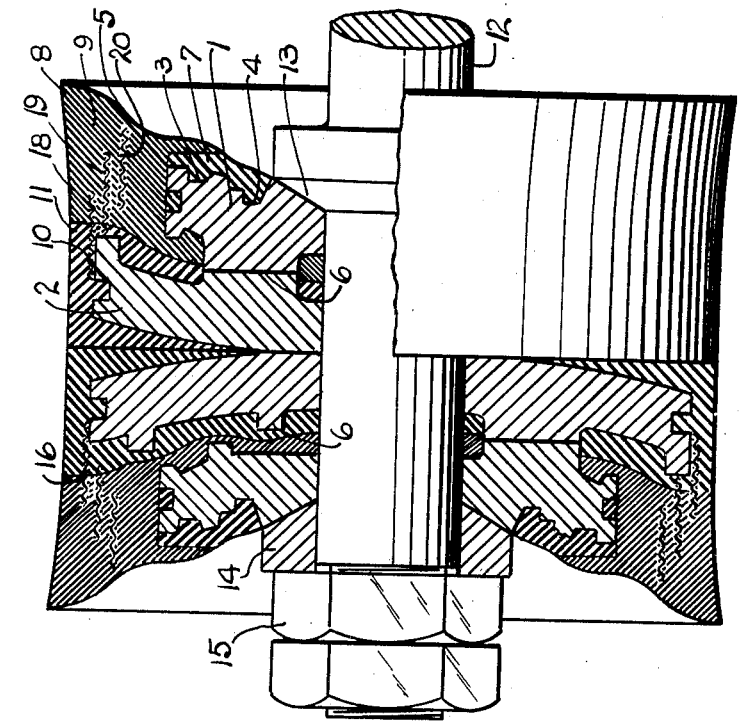
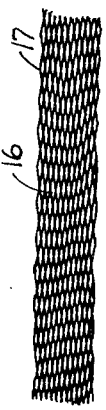
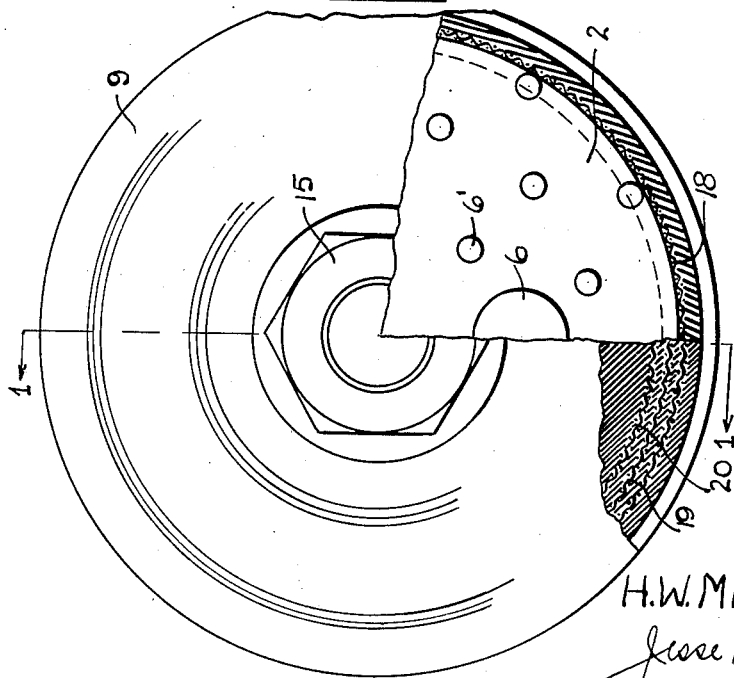
H. W. Millmine Inventor
By Jesse P. Stone
   Lester B. Clark
              Attorney Patented May 11, 1937

2,079,998

UNITED STATES PATENT OFFICE 2,079,998

PUMP PISTON

Herbert William Millmine, Houston, Tex.

Application January 12, 1934, Serial No. 706,345

3 Claims. (Cl. 309—23)

My invention relates to pump pistons and more particularly the type of piston which is to be employed in high pressure pumps handling material more or less abrasive.

It is an object of my invention to provide means for reenforcing the packing material which forms the sealing portion of the piston. In pistons of this character, in which there is a rubber body reenforced by metal plates therein, it has been found that the softer rubber toward the ends of the piston is subject to high pressure and tends to be compressed longitudinally so as to bulge out adjacent the harder rubber toward the middle of the piston. The piston will be worn adjacent the place where the rubber is distended and particles of the rubber will be broken off along the edge of the hard rubber, and be displaced so that eventually the softer rubber at the line adjacent the harder rubber will be weakened and that end of the piston will be doubled back and broken off.

It is an object of my invention to reenforce the softer rubber adjacent the line where it is more liable to radial distention, and thus prevent the deterioration of the piston along this line.

I contemplate the employment of strong steel wire woven in such manner as to be flexible and embed the same within the rubber, particularly along the line where the hard and soft rubber meet and thus prevent undue expansion of the rubber at that point.

It is a further object of the invention to provide a plurality of layers of woven steel wire embedded in the rubber and to overlap the layers in such manner as to most effectively prevent the excessive expansion of the soft rubber away from the outer end of the piston.

In the drawing herewith I have illustrated my invention applied to a reenforced type of pump piston used for double acting pumps, particularly in deep well pumping operations.

In the drawing Fig. 1 is a side view partly in elevation and partly in the central longitudinal section showing the application of my invention thereto.

Fig. 2 is an end view partly in section and showing the use of my invention.

Fig. 3 is a broken section of reenforcing wire which I contemplate using for reenforcing material.

The piston which I have shown is made up of a plurality of saucer-shaped steel plates 1 and 2 which act as reenforcing material for the piston. I have shown two pairs of these plates 1 and 2, arranged with the concave faces of each pair of plates facing toward the ends of the piston. The plates 1 adjacent the end of the piston are of smaller external diameter than the plates 2. Said plates 1 have circumferential channels 3 and 4 therein into which the rubber forming the body of the piston may be molded. There is also a circumferential channel 5 serving the same purpose. The adjacent sides of the two plates are adapted to contact so as to space them apart by short studs or projections 6 thereon which will be best understood from Fig. 2. Some of these studs are of large design and others marked 6' of small design. These studs serve not only to space the plates apart, but also act to anchor the rubber to the plates.

The said plates 1 just described furnish reenforcements for the end members 9 of comparatively soft rubber molded upon said plates. In order to obtain a close bond between the soft rubber and the plate I may enclose said plate in a coating indicated at 7 of hard rubber to which the soft rubber more readily may adhere. The members 9 have the outer face concaved and extended longitudinally toward the outer margin, and the circumferences of the end members are also extended outwardly at 8 so as to make them oversize to better contact with the walls of the cylinder and seal therewith.

The inner plates 2 are similarly provided with studs 6 engaging the similar studs on the forward plates and have circumferential channels 10 therein into which the rubber may be molded. The layer of rubber 11 on the inner plates is comparatively harder than the rubber on the forward plates 9. It furnishes a stronger end support for the rubber of the forward plate and is adapted to contact closely with the inner wall of the cylinder.

The two pairs of plates thus made up are adapted to be mounted upon the piston rod 12 in the usual manner, one end of the piston being supported against a flange 13 on the rod and the other end bearing against a conical washer 14 clamped in position by the nuts 15. When thus assembled a piston having the usual contour is produced. The difficulty with pistons of this character is that under the extremely high pressures to which they are subjected, the softer rubber in the end plates 9 will be compressed longitudinally and will be bulged out along the meeting surfaces between the soft and the hard rubber indicated at 16 in Fig. 1. This will cause excessive expansion radially at that point and pieces of rubber will be broken off until the end plates 9 are weakened. They will eventually double back and break off to such an extent that the piston will no longer function.

To prevent this undue expansion of the rubber along this face, I have reenforced the plates by a special reenforcing layer of woven wire. This wire which I employ is ordinarily called bead wire. It is made up of strands of steel wire 17 interwoven as shown in Fig. 3. A band of this woven steel wire will resist radial expansion of the rubber when embedded therein and is found to be a most effective means for reinforcing the piston. As seen in Fig. 1 these bands of woven steel wire are extended around the piston preferably in circumferential bands, although this particular arrangement is not compulsory. I arrange the bands so that their adjacent sides will overlap, the first or outer band 18 being embedded partly in the hard rubber 11 and partly in the soft rubber 9. The next band 19 extends only slightly within the hard rubber, and is embedded largely in the soft rubber and this band is of smaller diameter than the band 19. There may be a still further layer of this rubber as indicated at 20 embedded entirely within the soft rubber.

By arranging these bands to overlap in the manner shown it will be seen that when the excessive pressure is exerted against the end of the piston, the rubber will tend to flow outwardly toward the periphery of the piston. With the band arranged to overlap as shown, this tendency of the rubber to flow will be most effectively resisted.

It will also be noted that this arrangement of the reenforcing bands of woven wire will not materially interfere with the seal of the piston against the cylinder walls. It is sufficiently flexible to allow longitudinal movement of the rubber to a certain extent, but will resist the outward expansion of the rubber at the point where it tends to be injured in use. With reenforcing of this character in a heavy duty pump piston for the purpose described, the piston will last for materially longer periods of time and will still form an effective seal against the cylinder walls while in use.

Having described my invention, what I claim is:

1. A pump piston comprising a plurality of circular plates of rigid material having axial openings to fit upon a piston rod, a body of rubber enclosing said plates and adapted to seal against a cylinder wall, in combination with bands of flexible woven steel embedded in said body and outside said plates to reenforce said rubber and prevent undue expansion thereof, there being a plurality of said bands radially spaced and sequentially axially displaced in overlapping relation, those farthest from the end of said piston being largest in diameter.

2. A pump piston adapted to fit upon a piston rod and including two pairs of saucer-shaped plates each pair presenting its concave faces outwardly, the inner plate of each pair being embedded in hard rubber, the outer plate of each pair being embedded in softer rubber, said piston being of circular shape to engage within a cylinder, and woven wire reenforcing material embedded in said hard rubber and extending across the line between said hard and said soft rubber to resist excessive outward expansion of said soft rubber along said line in use.

3. A pump piston adapted to fit upon a piston rod and including two pairs of saucer-shaped plates each pair presenting its concave faces outwardly, the inner plate of each pair being embedded in hard rubber, the outer plate of each pair being embedded in softer rubber said piston being of circular shape to engage within a cylinder, and woven wire reenforcing material embedded in said hard and said soft rubber to resist excessive outward expansion of said soft relative to said hard rubber in use, said wire reenforcing material being arranged in overlapping layers, one layer being partly in said hard rubber and partly in said soft rubber.

HERBERT WILLIAM MILLMINE.